US008555042B2

(12) United States Patent  (10) Patent No.: US 8,555,042 B2
Garcia  (45) Date of Patent: Oct. 8, 2013

(54) APPARATUS, SYSTEM, AND METHOD FOR RESETTING AND BYPASSING MICROCONTROLLER STATIONS

(75) Inventor: Enrique Q. Garcia, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 12/129,144

(22) Filed: May 29, 2008

(65) Prior Publication Data

US 2009/0300342 A1  Dec. 3, 2009

(51) Int. Cl.
*G06F 9/00*  (2006.01)
*G06F 9/24*  (2006.01)
*G06F 15/177*  (2006.01)
*G06F 11/00*  (2006.01)
*G06F 11/16*  (2006.01)
*G05B 11/01*  (2006.01)
*G05B 9/02*  (2006.01)

(52) U.S. Cl.
USPC .......... 713/1; 713/2; 700/21; 700/79; 700/82; 714/2; 714/4.11; 714/4.2; 714/4.21; 714/56

(58) Field of Classification Search
USPC ................ 713/1, 2; 700/21, 79, 82; 714/2, 714/4.11, 4.2, 4.21, 56
See application file for complete search history.

(56) References Cited

U.S. PATENT DOCUMENTS

| 5,168,171 | A | * | 12/1992 | Tracewell | 307/64 |
| 6,041,414 | A | | 3/2000 | Kikuchi | |
| 6,360,277 | B1 | * | 3/2002 | Ruckley et al. | 709/250 |
| 6,629,247 | B1 | | 9/2003 | Hall et al. | |
| 7,181,630 | B2 | | 2/2007 | Kadoi et al. | |
| 8,208,370 | B1 | * | 6/2012 | Mitchell et al. | 370/217 |
| 2002/0026533 | A1 | * | 2/2002 | Dutta et al. | 709/313 |
| 2002/0133744 | A1 | * | 9/2002 | Oldfield et al. | 714/11 |
| 2003/0149796 | A1 | * | 8/2003 | Emerson et al. | 709/250 |
| 2004/0148547 | A1 | | 7/2004 | Thompson et al. | |
| 2005/0034003 | A1 | | 2/2005 | Sato et al. | |
| 2005/0058063 | A1 | * | 3/2005 | Masuyama et al. | 370/217 |
| 2005/0144616 | A1 | | 6/2005 | Hammond et al. | |
| 2005/0188247 | A1 | * | 8/2005 | Abe et al. | 714/5 |
| 2005/0273585 | A1 | * | 12/2005 | Leech | 713/1 |
| 2006/0005245 | A1 | * | 1/2006 | Durham et al. | 726/25 |
| 2006/0143289 | A1 | | 6/2006 | Smith et al. | |
| 2007/0014230 | A1 | * | 1/2007 | Colven et al. | 370/216 |
| 2007/0288674 | A1 | * | 12/2007 | Ikeno | 710/110 |
| 2008/0091932 | A1 | * | 4/2008 | McNutt et al. | 713/1 |

* cited by examiner

*Primary Examiner* — Kim Huynh
*Assistant Examiner* — Brandon Kinsey
(74) *Attorney, Agent, or Firm* — Kunzler Law Group

(57) ABSTRACT

An apparatus, system, and method are disclosed for resetting and bypassing microcontroller stations. A command module asserts and de-asserts a reset line in response to a command. A reset module resets a microcontroller station if the command module asserts and de-asserts the reset line within a time interval. In addition, the reset module bypasses the microcontroller station if the command module asserts and holds the reset line for a time period exceeding the time interval.

18 Claims, 5 Drawing Sheets

US 8,555,042 B2

APPARATUS, SYSTEM, AND METHOD FOR RESETTING AND BYPASSING MICROCONTROLLER STATIONS

BACKGROUND OF THE INVENTION

1. Field of the Invention

This invention relates to resetting microcontroller stations and more particularly relates to resetting and bypassing microcontroller stations.

2. Description of the Related Art

Microcontroller- and microprocessor-based devices are often used to perform control functions. For example, microcontroller-based devices may be used to gather environmental data, control environmental functions, control power supplies, manage machinery, and the like.

Microcontroller-based devices typically execute one or more firmware programs. A firmware program may be custom designed for a specific application. The firmware program is then downloaded to a microcontroller-based device and executed.

The microcontroller-based device may be managed by a host. The host may be a computer, a controller, and the like. The host may control a plurality of microcontroller-based devices. As used herein microcontroller-based devices are referred to as stations. Using a host to control a plurality of stations greatly simplifies the tasks of managing the stations.

It is often economical for a host to control a plurality of stations using a serial link. For example, the host may communicate through the serial link with the first station. The first station may communicate with a second station, and a second station with a third station. The host may communicate with the third station through the first and second station. For example, the host may communicate a firmware download to the first station. The first station may communicate the firmware download to the second station, and the second station may communicate a firmware download to the third station.

A microcontroller or microprocessor typically both manages the functions of the station and manages communications with upstream and downstream devices. Unfortunately, if the microcontroller becomes hung due to a firmware bug, a station may be unable to communicate with an upstream device and receive a firmware update to correct the bug. Resetting the microcontroller may be ineffective as the microcontroller quickly hangs after reset. As a result, an administrator may need to manually reload microcode.

SUMMARY OF THE INVENTION

From the foregoing discussion, there is a need for an apparatus, system, and method that resets and bypasses microcontroller stations. Beneficially, such an apparatus, system, and method would allow a microcontroller station to be either reset or bypassed into a safe mode that supports a firmware update.

The present invention has been developed in response to the present state of the art, and in particular, in response to the problems and needs in the art that have not yet been fully solved by currently available reset and bypass methods. Accordingly, the present invention has been developed to provide an apparatus, system, and method for resetting and bypassing a station that overcome many or all of the above-discussed shortcomings in the art.

The apparatus to reset and bypasses a station is provided with a plurality of modules configured to functionally execute the steps of receiving a command, asserting and de-asserting a reset line, resetting the station, and bypassing the station. These modules in the described embodiments include a reset line, a command module, and a reset module.

The command module asserts and de-asserts the reset line in response to a command. The reset module resets the station if the command module asserts and de-asserts the reset line within a time interval. In addition, the reset module bypasses the station if the command module asserts and holds the reset line for a time period exceeding the time interval.

A system of the present invention is also presented to reset and bypass a station. The system may be embodied in a control system. In particular, the system, in one embodiment, includes a host and a plurality of stations.

The host includes the command module. Each station includes a command module and a reset module. The host is in communication with one downstream station through a reset line and a bus. Each station is in communication through a reset line and a bus with at least one device selected from the host, an upstream station, and a downstream station. The host and station form a serial chain. Each command module asserts and de-asserts a downstream reset line in response to a command received through the bus. Each reset module resets the station if an upstream command module asserts and de-asserts the reset line within a time interval. In addition, each reset module bypasses the station if the upstream command module asserts and holds the reset line for time period exceeding the time interval.

A method of the present invention is also presented for resetting and bypassing a station. The method in the disclosed embodiments substantially includes the steps to carry out the functions presented above with respect to the operation of the described apparatus and system. In one embodiment, the method includes receiving a command, asserting and de-asserting a reset line, resetting the station, and bypassing the station.

A command module receives a command. The command module asserts and de-asserts a reset line within a time interval for a reset command. In addition, the command module asserts the reset line for a bypass command. A reset module resets the station if the reset line is asserted and de-asserted within the time interval. In addition the reset module bypasses the station if the reset line is asserted and held for a time period exceeding the time interval.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention may either reset or bypass the station using a single reset line. In addition the present invention may allow a station to be booted in a safe mode for downloading firmware. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
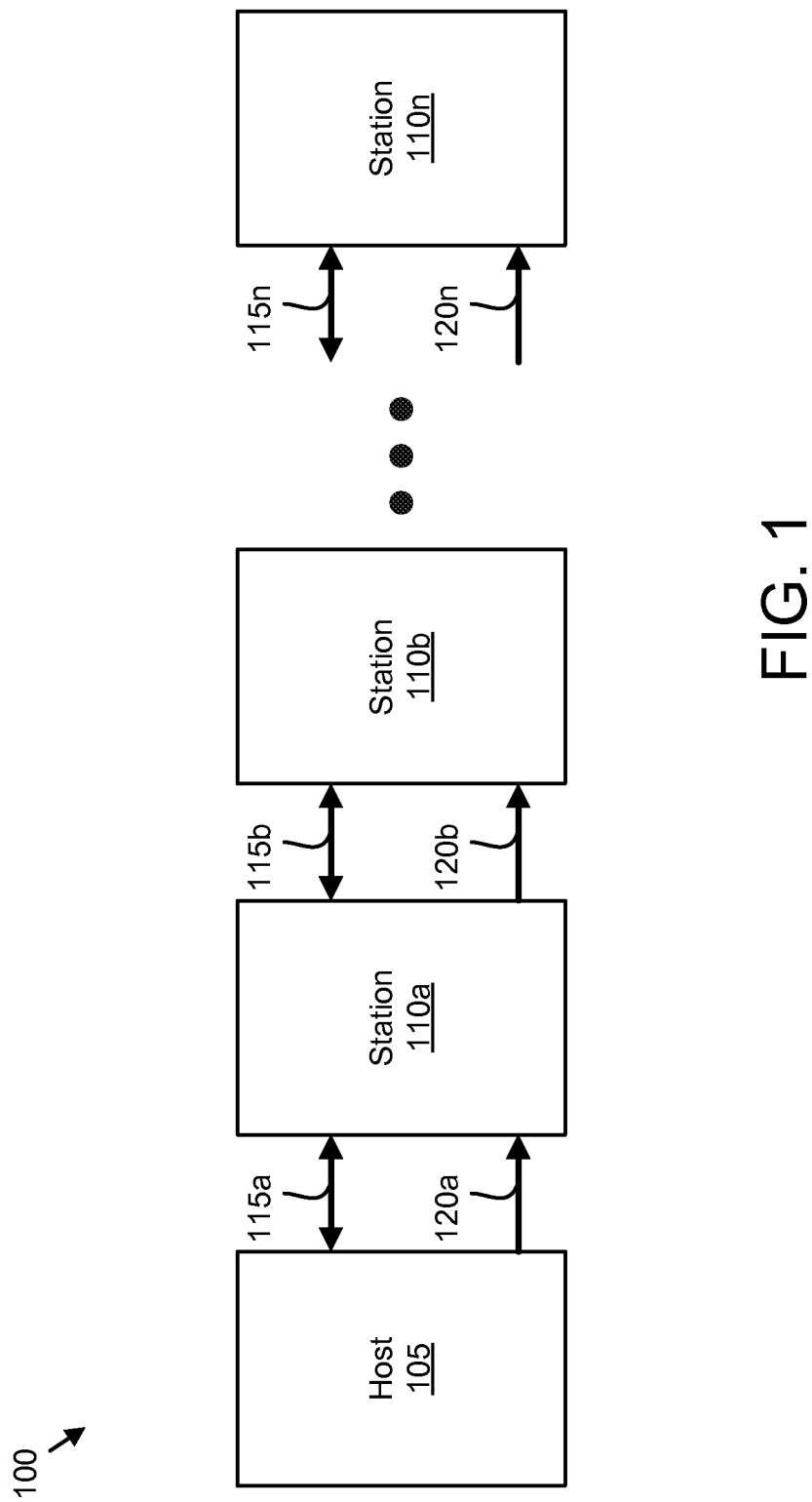
FIG. 1 is a schematic block diagram illustrating one embodiment of a control system in accordance with the present invention.

FIG. 1 is a schematic block diagram illustrating one embodiment of a control system 100 in accordance with the present invention. The control system 100 includes a host 105 and a plurality of stations 110. The host 105 is in communication with one downstream station 110a. The host 105 communicates with the station 110a through a bus 115a and a reset line 120a.

Each station 110 is in communication through a reset line 120 and a bus 115 with either the host 105, an upstream station 115, and/or a downstream station 115. The host 105 and the stations 110 form a serial chain.

In one embodiment, each station 110 is an uninterruptible power supply. Alternatively, each station 110 may include an environmental sensor, a video camera, an environmental control, a device controller, or the like.

Each station 110 may include a microcontroller or microprocessor. As used herein microcontroller will be used to denote both microcontrollers and microprocessors. In addition, a firmware program is referred to as firmware. Firmware includes software instructions and data.

The microcontroller may control the functions of the station 110 as directed by a firmware. The station 110 may perform many functions autonomously, without direction from the host 105. For example, the microcontroller under firmware direction may control uninterruptible power supplies.

The host 105 may manage each station 110. For example, the host 105 may download firmware to each station 110. In addition, the host 105 may activate and/or deactivate each station 110. The host 105 may further request reports from the stations 110 and receive data from the stations 110.

The host 105 may communicate commands to a station 110 through the serial chain of stations 110. For example, the host 105 may communicate a command to a second station 110b by communicating the command to a first station 110a and directing the first station 110a to relay the command to the second station 110b. Similarly, the host 105 may communicate firmware to the second station 110b by communicating the firmware to the first station 110a and directing the first station 110a to relay the firmware to the second station 110b.

In one embodiment, each bus 115 is an RS-485 serial communication link. Alternatively, each bus 115 may be a Universal Serial Bus (USB) serial communication link. In a certain embodiment, each bus 115 may be a serial communication link selected from an RS-232 bus, an RS-423 bus, a Fibre Channel bus, an Inter-Integrated Circuit (I2C) bus, a Serial Advanced Technology Attachment (SATA) bus, or the like.

In one embodiment, the reset line 120 is a single wire. In the past, a single wire reset line 120 has been used to reset stations 110. Unfortunately, when stations 110 fail because of faulty firmware, resetting the station 110 only causes the station 110 to reboot and hang again. With the station 110 and/or station microcontroller hung, the station 110 is unable to communicate with upstream and downstream stations 110. In addition, if the station 110 requires corrected firmware, the host 105 may be unable to download the corrected firmware to the station 110. The present invention allows the reset line 120 to either reset a station 110 or bypass the station 110 so that corrected firmware may be downloaded as will be described hereafter.

Figure 2:
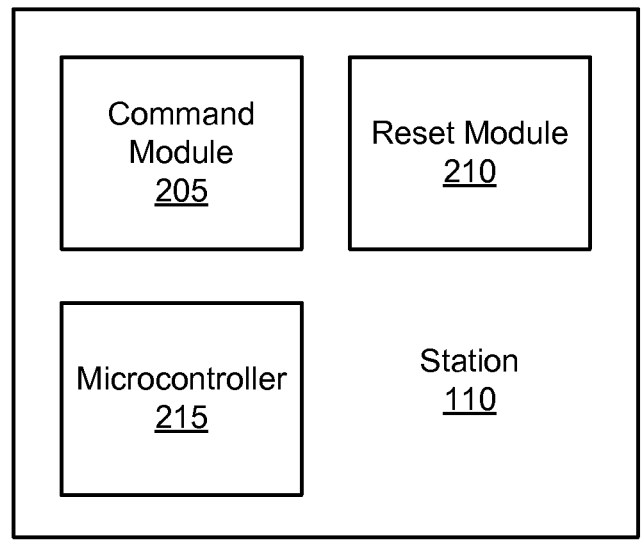
FIG. 2 is a schematic block diagram illustrating one embodiment of a station of the present invention.

FIG. 2 is a schematic block diagram illustrating one embodiment of a station 110 of the present invention. The station 110 is the station 110 of FIG. 1. The description of the station 110 refers to elements of FIG. 1, like numbers referring to like elements. The station 110 includes a command module 205, a reset module 210, and a microcontroller 215.

The microcontroller 215 may include a sequencer and an instruction store integrated on a semiconductor device. The semiconductor device may both store and execute firmware. Alternatively, the microcontroller 215 may include a separate semiconductor memory such as flash memory that stores the firmware.

The command module 205 and the reset module 210 may comprise a computer program product comprising a computer readable program that is stored on a semiconductor device and/or the microcontroller 215 and executed by the microcontroller 215. In addition, the command module 205 and reset module 210 may include connectors, semiconductor hardware, and the like. In particular, the reset module 210 includes semiconductor hardware that will be described hereafter.

The command module 205 receives a command communicated from the host 105 through one or more buses 115. For example, the host 105 may communicate a reset command through the first station 110a to the command module 205 of the second station 110b. The command module 205 asserts and de-asserts the reset line 120 in response to the command.

The reset module 210 resets the station 110 if the command module 205 asserts and de-asserts the reset line 120 within a time interval. In addition, the reset module 210 bypasses the station 110 if the command module 205 asserts and holds the reset line f120 for a time period exceeding the time interval.

Figure 3:
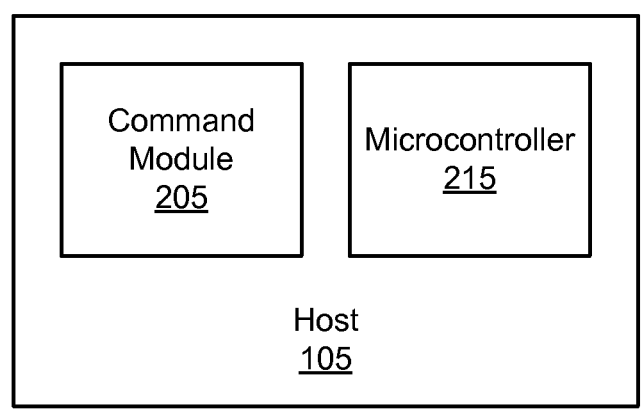
FIG. 3 is a schematic block diagram illustrating one embodiment of a host of the present invention.

FIG. 3 is a schematic block diagram illustrating one embodiment of a host 105 of the present invention. The host 105 is the host 105 of FIG. 1. The description of the host 105 refers to elements of FIGS. 1-2, like numbers referring to like elements. The host 105 includes a command module 205 and a microcontroller 215. The command module 205 and microcontroller 215 may be functionally equivalent to the command module 205 and microcontroller 215 of FIG. 2.

The microcontroller 215 may execute one or more computer program products that manage the host 105 and the stations 110. The computer program products may comprise computer readable programs stored on the microcontroller 215, a semiconductor storage device such as a flash memory, a hard disk drive, and the like.

In one embodiment, the host 105 may communicate a reset command or a bypass command to the command module 205 of the host 105 or to the command module 205 of a specified station 210. The reset command directs the command module 205 to reset a downstream station 110. The bypass command directs the command module 205 to bypass a downstream station 110. The command modules 205 of FIGS. 2 and 3 may reset and/or bypass the downstream station 110 using only the reset line 120. The reset line 120 may be a single wire. The present invention allows the command modules 205 to either reset or bypass the downstream station 110 using the single wire reset line 120 as will be described hereafter.

Figure 4:
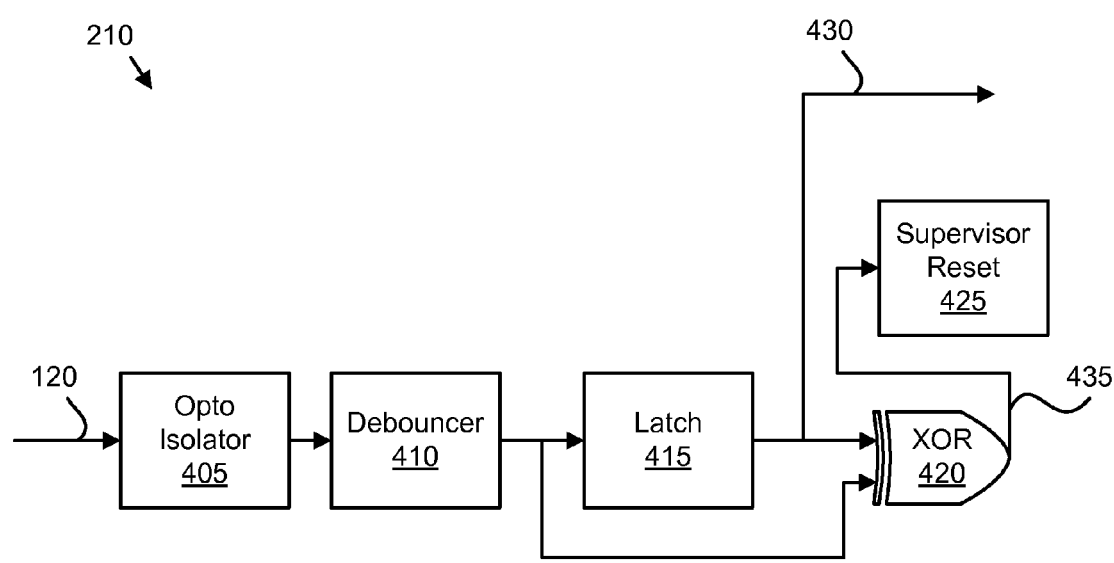
FIG. 4 is a schematic block diagram illustrating one embodiment of a reset module of the present invention.

FIG. 4 is a schematic block diagram illustrating one embodiment of a reset module 210 of the present invention. The reset module 210 may be embodied in the reset module 210 of FIG. 2. The description of the reset module 210 refers to elements of FIGS. 1-3, like numbers referring to like elements. The reset module 210 includes an opto-isolator 405, a debouncer 410, a latch 415, an exclusive or (XOR) gate 420, a supervisor reset 425, and a bypass mode signal 430.

The reset module 210 receives a signal through the reset line 120 of an upstream station 110 or the host 105. The opto-isolator 405 may electrically isolate the reset line 120 from the rest of the reset module 210. The opto-isolator 405 communicates an assertion and de-assertion of the reset line 120 as an electronic signal to the debouncer 410. The debouncer 410 debounces the electronic signal. In one embodiment, the debouncer 410 to balances the electronic signal for at least 150 milliseconds.

The latch 415 latches the debounced electronic signal. Thus when the control module 205 asserts the reset line 120, the latch 415 stores the assertion until the latch 415 is reset. In one embodiment, the latch 415 is reset when the station 110 completes a reset and/or when the station 110 enters the bypass mode.

The XOR gate 420 performs a logical exclusive or function on the input to and the output from the latch 415. When the control module 205 asserts and then de-asserts the reset line 120 within the time interval, the input to and the output from the latch 415 are logical inverses. As a result, the XOR gate 420 asserts a control line 435 that causes the supervisor reset 425 to reset the station 110. The supervisor reset 425 resets the station 110 to a normal operating mode. The microcontroller 215 of the station 110 may boot normal operating firmware and resume operations.

When the control module 205 asserts and then holds the reset line 124 for a time period exceeding the time interval, the bypass mode signal 430 is asserted. In one embodiment, the bypass mode signal 430 directs the microcontroller 215 to boot into safe mode that bypasses the station 110. For example, the microcontroller 215 may boot a bypass firmware program at a specified address. The bypass firmware program may only allow the station 110 to communicate with an upstream device such as the host 105 or an upstream station 110. The bypass firmware program may also support downloading firmware.

Thus if the normal operating firmware of the station 110 is defective and renders the microcontroller 215 unable to communicate with upstream devices, the host 105 may communicate the bypass command to the command module 205 upstream of the defective station 110. The command module 205 may use the reset line 120 to bypass the defective station 110. The defective station 110 boots into safe mode and establishes communication with the upstream station 110. The host 105 may then communicate corrected firmware to the upstream station 110. The upstream station 110 communicates the corrected firmware to the defective station 110 and the defective station 110 loads the firmware.

The host 105 may then communicate a reset command to the upstream station 110. The upstream station 110 resets the defective station 110 using the reset line 120. The defective station 110 may boot using the corrected firmware and resume normal operations.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
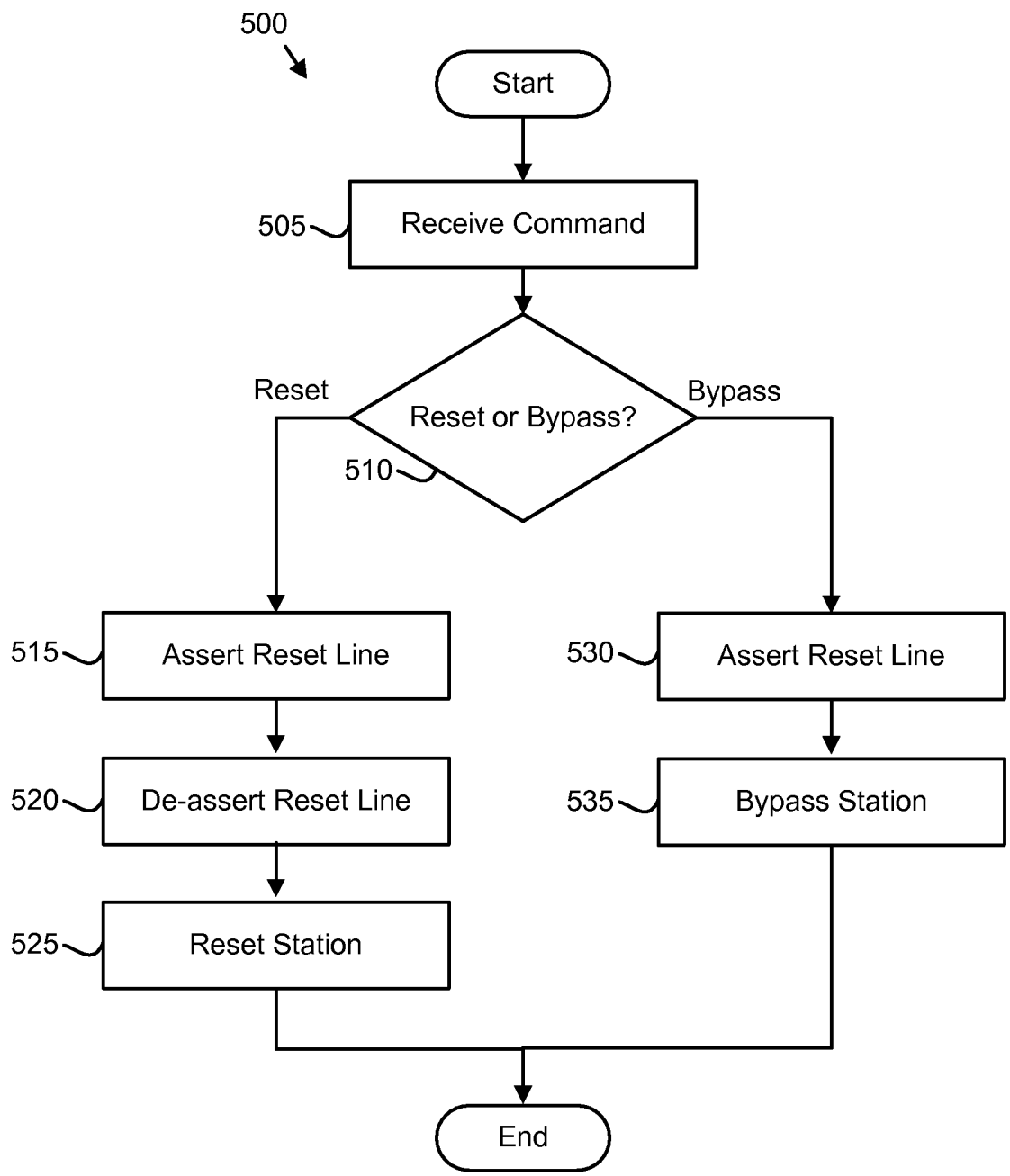
FIG. 5 is a schematic flow chart diagram illustrating one embodiment of a reset and bypass method of the present invention.

FIG. 5 is schematic flow chart diagram illustrating one embodiment of a reset and bypass method 500 of the present invention. The method 500 substantially includes the steps to carry out the functions presented above with respect to the operation of the described apparatus and system of FIGS. 1-4. The description of the method 500 refers to elements of FIGS. 1-4, like numbers referring to like elements.

In one embodiment, the method 500 is implemented with one or more semiconductor devices. In addition, the method 500 may be implemented with a computer program product comprising a computer readable medium such as a semiconductor device having a computer readable program. The computer readable program may be executed by a microcontroller 215.

The method 500 begins, and the command module 205 receives 505 a command. In one embodiment, the host 105 communicates the command through one or more stations 110 over the bus 115. The command may be a reset command. Alternatively, the command may be a bypass command.

In one embodiment, the host 105 may communicate the bypass command after repeatedly resetting a defective station 110. If the host 105 is unable to communicate with the defective station 110 after resetting the defective station 110, the host 105 may determine that the firmware of the defective station 110 requires correction. Alternatively, the administrator may direct the host 105 to bypass a station 110 by issuing the bypass command. The administrator may further direct the host 105 to download updated firmware to the station 110.

The command module 205 determines 510 if the command is a reset command or a bypass command. If the command module 205 determines 510 that the command is a reset command, the command module 205 asserts 515 and de-asserts 520 the reset line 120 within the time interval. In one embodiment, the time interval is in the range of 200 to 1000 milliseconds. In a certain embodiment, the time interval is in the range of 250 to 500 milliseconds.

In one embodiment, the microcontroller 215 times the time interval. For example, the microcontroller 215 may use one or more internal timers to time the time interval. In an alternate embodiment, a resistor/capacitor circuit may be used to time the time interval as is well known to those of skill in the art.

The reset module 210 resets 525 the station 110 in response to the command module 205 asserting 515 and de-asserting 520 the reset line 120 within the time interval and the method 500 ends. In one embodiment, the supervisor reset 425 resets the microcontroller 215 of the station 110. The microcontroller 215 may boot using the normal firmware program to a normal operating mode. For example, an uninterruptible power supply station 110 may resume managing an uninterruptible power supply.

If the control module 205 determines 510 that the command is a bypass command, the command module 205 asserts 530 the reset line 120. In addition, the command module 205 may hold the reset line 120 as asserted for a time period exceeding the time interval. The reset module 210 bypasses 535 the station 110 if the reset line 120 is asserted 530 and held for a time period exceeding the time interval and the method 500 ends.

The present invention allows the host 105 to either reset a station 110 to a normal operating mode or to bypass the station 110 using the reset line 120. Thus the present invention may allow a system with a single wire reset line 120 to support either resetting or bypassing the station 110. The bypassed station 110 may be booted into a safe mode that supports the download of a firmware update. Thus defective firmware may be updated without manual intervention and/or taking the station 110 off-line.

Figure 6:
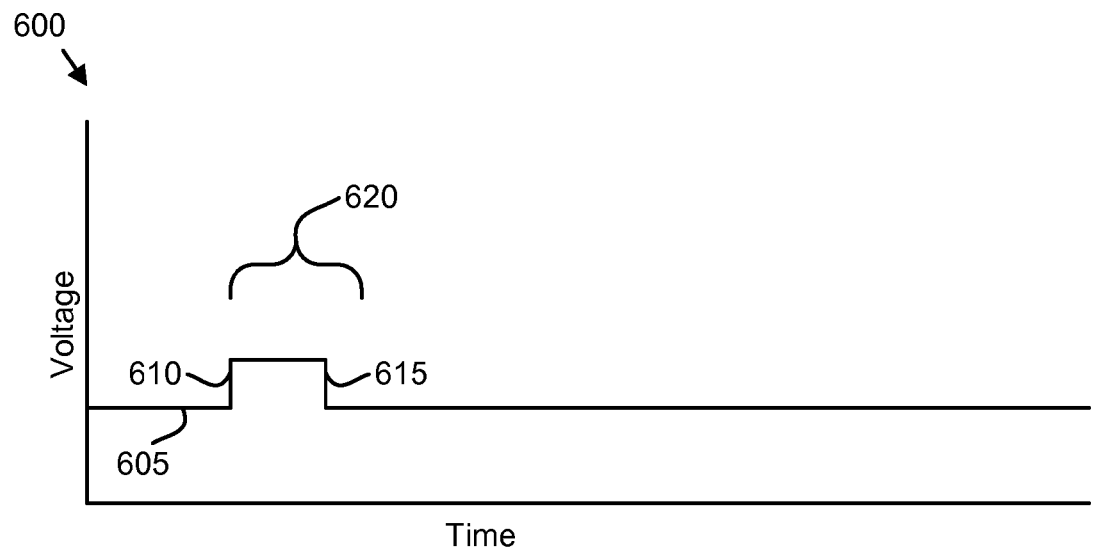
FIG. 6 is a graph illustrating one embodiment of a reset signal of the present invention.

FIG. 6 is a graph 600 illustrating one embodiment of a reset signal 605 of the present invention. The reset signal 605 represents a voltage of the reset line 120 of FIGS. 1 and 4. Voltage is represented on a vertical axis while time is represented on a horizontal axis. The description of the graph 600 refers to elements of FIGS. 1-5, like numbers referring to like elements. The graph 600 shows the reset signal 605, an assertion of the reset signal 610, a de-assertion of the reset signal 615, and the time interval 620.

In response to receiving 505 a reset command, the command module 205 asserts 515 the reset signal 610. The assertion 515 of the reset signal 610 is depicted as increasing the voltage of the reset signal 605 from a low voltage such as 0 volt to a high-voltage such as one volt. However one of skill in the art will recognize that asserting 515 the reset signal 610 may also be a transition from a high voltage to a low voltage. The present invention may also be practiced using any logic voltage levels.

The command module 205 further de-asserts 520 the reset signal 615 within the time interval 620. As a result, the reset module 210 resets 525 the station 110. The reset command is unambiguously communicated to the reset module 205 using the reset signal 605.

Figure 7:
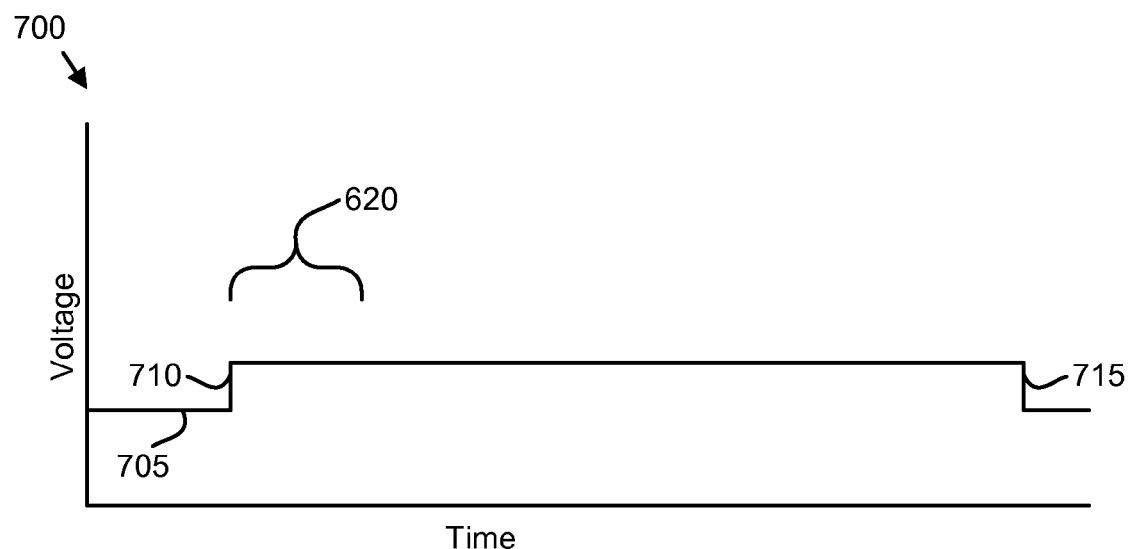
FIG. 7 is a graph illustrating one embodiment of a bypass signal of the present invention.

FIG. 7 is a graph 700 illustrating one embodiment of a bypass signal 705 of the present invention. The graph 700 depicts voltage in a vertical axis and time in a horizontal axis as in FIG. 6. The bypass signal 705 is the electric signal communicated through the reset line 120 by the command module 205 in response to the bypass command. The grass 700 includes the bypass signal 705, an assertion of the bypass signal 710, a de-assertion of the bypass signal 715, and the time interval 620. The description of the graph 700 refers to elements of FIGS. 1-6, like numbers referring to like elements.

In response to receiving 505 a bypass command, the command module 205 asserts 530 the bypass signal 710. In addition, the command module 205 continues to assert 530 the bypass signal 710 for a time period that exceeds the time interval 620. The command module 205 may eventually de-assert the bypass signal 715. However, as the de-assertion 715 occurs after the time interval 620, the reset module 210 unambiguously identifies the bypass signal 705 as a directive to bypass the station 110.

The present invention may either reset or bypass a station 110 using a single reset line 120. In addition the present invention may allow the station 110 to be booted in a safe mode for downloading firmware. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to reset and bypass a station, the apparatus comprising:
   a reset line;
   a command module asserting and de-asserting the reset line in response to a command; and
   a reset module embodied in the station and in communication with the command module over the reset line, the station communicating with an upstream device and a downstream device over a bus if the station is not in a safe mode, wherein the reset module resets the station if the command module asserts and subsequently de-asserts the reset line within a time interval and bypasses the station if the command module asserts and holds the reset line for a time period exceeding the time interval, wherein the bypassed station boots in the safe mode and only communicates with the upstream device and loads firmware over the bus from the upstream device in the safe mode.

2. The apparatus of claim 1, wherein the reset module boots the station to a normal operating mode when resetting the station.

3. The apparatus of claim 1, further comprising an opto-isolator that electrically isolates the reset line from the reset module and communicates the assertion and de-assertion of an electric signal of the reset line to reset module.

4. The apparatus of claim 3, further comprising a debouncer that debounces the electric signal communicated from the opto-isolator to the reset module.

5. The apparatus of claim 4, wherein the debouncer debounces the electric signal for at least 150 milliseconds.

6. The apparatus of claim 1, wherein the time interval is in the range of 200 to 1000 milliseconds.

7. A method to reset and bypass a station, the method comprising:
receiving a command;
asserting and subsequently de-asserting a reset line in communication with the station within a time interval for a reset command, the station communicating with an upstream device and a downstream device over a bus if the station is not in a safe mode;
asserting the reset line for a bypass command;
resetting the station if the station detects the reset line is asserted and subsequently de-asserted within the time interval; and
bypassing the station if the station detects the reset line is asserted and held for a time period exceeding the time interval, wherein the bypassed station boots in the safe mode and only communicates with the upstream device and loads firmware over the bus from the upstream device in the safe mode.

8. The method of claim 7, wherein resetting the station boots the station to a normal operating mode.

9. A system to reset and bypass a station, the system comprising:
a host comprising a command module;
a plurality of stations each comprising a command module and a reset module, wherein the host is in communication with one downstream station through a reset line and a bus, each station is in communication through the reset line and the bus with at least two devices selected from the host, an upstream station, and a downstream station if the station is not in a safe mode, the host and stations form a serial chain, and wherein each command module is configured to assert and de-assert a downstream reset line in response to a command received through the bus and each reset module configured to reset the station if an upstream command module asserts and subsequently de-asserts the reset line within a time interval and to bypass the station if the upstream command module asserts and holds the reset line for a time period exceeding the time interval, wherein the bypassed station boots in the safe mode and only communicates with an upstream device and loads firmware over the bus from the upstream device in the safe mode.

10. The system of claim 9, wherein the stations are configured as uninterruptable power supplies.

11. The system of claim 9, wherein each bus is configured as an RS-485 serial communication link.

12. The system of claim 9, wherein the reset module boots the station to a normal operating mode when resetting the station.

13. The system of claim 9, wherein the each reset line comprises a single wire.

14. An apparatus to reset and bypass a station, the apparatus comprising:
means for communicating a signal;
means for asserting and de-asserting the signal of the communicating means in response to a command;
means for resetting the station if the asserting/de-asserting means asserts and subsequently de-asserts the signal within a time interval, the means for resetting embodied in the station, the station communicating with an upstream device and a downstream device over a bus if the station is not in a safe mode; and
means for bypassing the station if the asserting/de-asserting means asserts and holds the signal for a time period exceeding the time interval, wherein the bypassed station boots in the safe mode and only communicates with the upstream device and loads firmware over the bus from the upstream device in the safe mode, the means for bypassing embodied in the station.

15. The apparatus of claim 1, wherein the reset module resets and bypasses the station using only the single reset line and the single reset line is a single wire reset line.

16. The method of claim 7, wherein the station is reset and bypassed using only the single reset line and the single reset line is a single wire reset line.

17. The system of claim 9, wherein each reset module resets and bypasses the station using only the single reset line and the single reset line is a single wire reset line.

18. The apparatus of claim 14, wherein the means for bypassing resets and bypasses the station using only the single means for communicating and the single means for communicating is a single wire reset line.

* * * * *